UNITED STATES PATENT OFFICE.

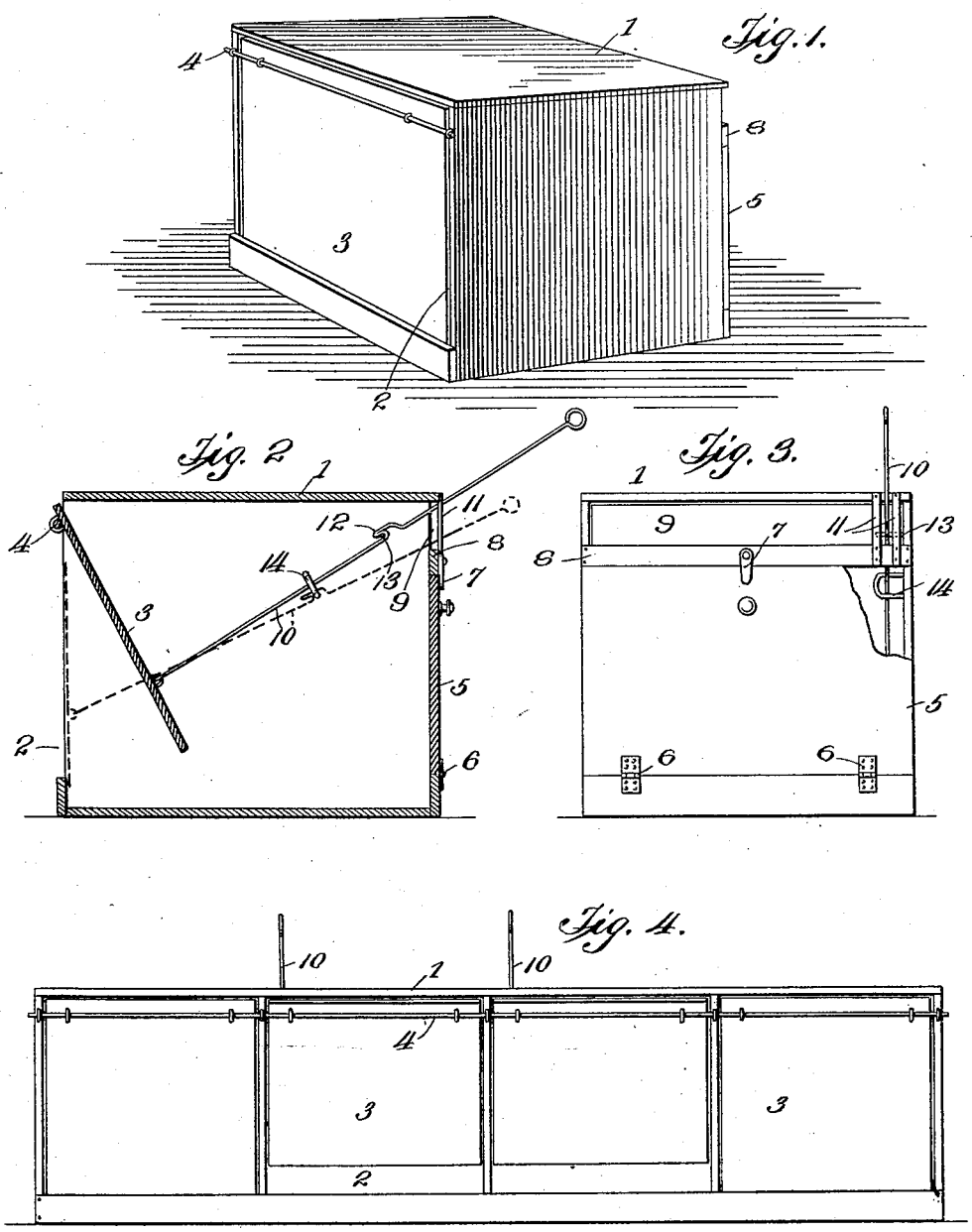

MICHAEL JAMES WHITTY, OF CROTON-ON-HUDSON, NEW YORK.

TRAP-NEST FOR HENS.

No. 904,390.      Specification of Letters Patent.      Patented Nov. 17, 1908.

Application filed July 16, 1908. Serial No. 443,790.

*To all whom it may concern:*

Be it known that I, MICHAEL J. WHITTY, a subject of the King of Great Britain, and a resident of Croton-on-Hudson, in the county of Westchester and State of New York, have invented a new and Improved Trap-Nest for Hens, of which the following is a full, clear, and exact description.

This invention relates to improvements in nests for laying hens, the object being to provide a nest with a simple means for holding the door for the entrance sufficiently open to permit a hen to enter, and which will be released by the entering of the hen, permitting the door to spring closed, thus trapping the fowl until such time as an attendant may take the number of the fowl for recording the number of eggs laid during the season.

I will describe a trap nest for hens, embodying my invention, and will then point out the novel features in the appended claims.

Reference is to be had to the accompanying drawings, forming a part of this specification, in which similar characters of reference indicate corresponding parts in all the figures.

Figure 1 is a perspective view of a trap nest embodying my invention; Fig. 2 is a sectional elevation thereof, showing the entrance door as open; Fig. 3 is a rear elevation with a part of the rear door broken away to clearly show other parts; and Fig. 4 is an elevation showing a plurality of the nests as they are placed in large establishments or poultry farms.

Referring to the drawings, 1 designates a box in which the nest is arranged, having at its front side an entrance opening 2, which when a hen is within the nest is closed by a door 3, swinging from its upper portion; as here shown, the door swings on a rod 4.

At the rear side of the box is an opening normally closed by a door 5, mounted at its lower edges on hinges 6, and it is held in closed position by any suitable means; I have here shown a button 7 for engaging with the upper portion of the door, the said button being mounted to swing on a cross bar 8 above which is an opening 9 for admitting air.

As a means for holding the door open to permit the entrance of a hen, I employ a rod 10 which is pivotally connected to the door near one end and extends upward and outward through guides 11 extended across the opening 9. This rod is provided with a hook member 12 at its upper side, which opens downward and is designed when holding the door open to engage with a pin 13 attached to the end wall of the box.

In operation, when the parts are in the position indicated in Fig. 2, a hen may freely enter and in so entering will engage the lower edge of the door 3, moving it upward so that the hook 12 will be moved out of engagement with the pin 13, permitting the rod 10 to drop in the guides 11, thus passing the hook 12 below the pin 13 and when thus released the door 3 will swing by gravity to closed position, thus trapping the hen. In order to prevent another hen from opening the door 3 from the outside and passing into the nest to the hen already there, the door 3 is locked when swung into a closed position, by the back of the hook 12 engaging a staple 14 attached to the side of the nest. The hen trapped in the nest is released after taking the number and recording the same.

It will be seen that a trap nest embodying my invention is very simple in its construction and has no parts liable to get out of order.

Having thus described my invention, I claim as new and desire to secure by Letters Patent:

1. A hen's nest, comprising a box having an inlet opening, a swinging door for said opening, a rod extended from said door through the side of the box opposite the inlet, a hook on said rod, and a pin for engagement by the said hook.

2. A hen's nest, comprising a box having an inlet opening, a swinging door for said opening, a rod extended from said door through the side of the box opposite the inlet, a hook on the upper side of said rod and opening downward, and a fixed pin with which said hook is designed to engage.

3. A trap nest for hens, comprising a box having an inlet opening at one side, and an outlet opening at the opposite side, a swinging door for the inlet opening, a rod pivotally connected to said door near one end and extended upward and outward through the outlet side of the box, a hook on said rod, a fixed pin with which said hook is designed to engage, and a door for the outlet opening.

4. A hen's nest, comprising a box having an inlet opening, a swinging door for said opening, a rod extended from said door through the side of the box opposite the inlet, a hook on said rod, a pin for engagement by the said hook, and a staple adapted to be engaged by the said hook for holding the released door in a locked position.

In testimony whereof I have signed my name to this specification in the presence of two subscribing witnesses.

MICHAEL JAMES WHITTY.

Witnesses:
E. AHRENS,
S. H. GOODACRE.